United States Patent [19]

Mentzer et al.

[11] Patent Number: 5,620,510
[45] Date of Patent: Apr. 15, 1997

[54] SWOLLEN STARCHES AS PAPERMAKING ADDITIVES

[75] Inventors: Merle J. Mentzer, Mokena, Ill.; Eduardo A. Piazza, Baradero, Argentina

[73] Assignee: CPC International Inc., Englewood Cliffs, N.J.

[21] Appl. No.: 493,881

[22] Filed: Jun. 23, 1995

[51] Int. Cl.$^6$ .................. D21H 17/28; C09D 103/02
[52] U.S. Cl. .................................. 106/206.1; 102/175
[58] Field of Search ................... 106/206.1; 162/175

[56] References Cited

U.S. PATENT DOCUMENTS

| | | | |
|---|---|---|---|
| 2,113,034 | 4/1938 | Rowland et al. | 92/21 |
| 2,328,537 | 9/1943 | Felton et al. | 127/33 |
| 2,805,966 | 9/1957 | Etheride | 127/32 |
| 5,288,317 | 2/1994 | Johansson et al. | 106/206.1 |

OTHER PUBLICATIONS

Whistler and Paschall, Starch: Chemistry and Technology, Academic Press Inc., New York, NY vol. 2, (1967), Chapter VI.

*Primary Examiner*—David Brunsman
*Attorney, Agent, or Firm*—Brooks Haidt Haffner & Delahunty

[57] ABSTRACT

A wet end additive composition which is used as a sizing agent in a papermaking process, the composition comprising a two phase suspension of swollen starch having a dry substance from about 0.5 to about 30% by weight, a cooked swollen volume from about 1.6 ml./gram to about 100 ml./gram and cooked solubles from about 0.5% to about 50% by weight. The composition is prepared starting with a starch slurry having a relatively low concentration (dry substance) of starch. The slurry is subjected to carefully controlled swelling conditions (temperature and pH) which can vary depending upon the type of starch employed. The dry substance of the slurry also may vary depending upon whether a continuous or batch process is employed. The composition is used in a papermaking process by adding it to the furnish after the refining stage.

17 Claims, No Drawings

SWOLLEN STARCHES AS PAPERMAKING ADDITIVES

BACKGROUND OF THE INVENTION

1. Field of the Invention

The present invention has to do with additives used in the wet end of the papermaking processes. More particularly, the invention relates to swollen starches which are added as dry strength additives in the papermaking process.

2. Description of Related Art

Paper is manufactured for the most part from wood pulp. There are many different kinds of wood pulp: mechanical pulp (ground wood), semi-chemical pulp, sulfite pulp, sulfate or kraft pulp, soda pulp, and the like. Some are prepared by purely mechanical means, others by a combination of mechanical and chemical means, and some by chemical means. The mechanical pulp contains substantially all the wood except the bark and that lost during storage and transportation. Semi-chemical pulps are partially free of lignin. Chemical pulp, however, are essentially cellulose, the unwanted lignin and other non-cellulosic components of the wood having been dissolved away by the cooking and bleaching treatment. Because of this, chemical pulps are much superior to mechanical and semi-chemical pulps for fine papermaking. However, because of the special processing required, they are too expensive to serve as a main source of fiber for the cheaper grades of paper such as newsprint.

If the pulp fibers were the only constituents of a paper sheet, the usefulness of the paper would be very restricted because the sheet would be soft, have a yellowish color, and could not be successfully written or printed upon with ink. If the sheet was thin, it would be transparent to matter printed upon the opposite side. It is necessary, then, to add other ingredients, such as sizing or coloring agents and fillers to the cellulosic fibers to produce papers suited to their many uses.

Many papers, except the absorbent types, filter papers and most packaging papers, must have a finely ground filler added to them, the purpose of which is to provide opacity and whiteness to the paper. Sizing is added to the paper, other than absorbent papers and filter paper, to impart resistance to penetration by liquids. The common sizing agents are added to the stock (i.e., wet pulp, more specifically, the prepared papermaking furnish) before it is formed into a sheet. These may be acid, neutral and alkaline sizing materials. Acid sizes are typically rosin based and precipitated by alum. Neutral sizes may also be rosin-based, but are used at near neutral pHs. Alkaline sizes are synthetic materials such as alkenyl succinic anhydride (ASA) and alkyl ketene dimer (AKD). Such sizings as described in this paragraph are known in the trade as internal sizing.

The term sizing is also used in a second context in the paper industry. This second use is known as surface sizing. It differs from the internal sizing previously described in that it is applied to the surface of the paper where it cements the fibers to the body of the paper and deposits a more or less continuous film on the paper surface. Surface sizing is used to produce a smooth hard surface which will not catch a pen when the paper is written upon, will not pick off if the paper is printed using tacky inks and will not show feathering of the ink. An additional advantage of a surface size is that oil resistance of the paper is improved since the size tends to seal the pores of the paper. Surface sizing may be of greater importance than internal sizing for certain types of papers such as writing papers, printing papers and some wrapping papers. It is important to surface size paper that is used in an offset printing process since this prevents loosening of surface fibers when the paper is moistened with water on the press.

A common way to add a surface size is to apply the sizing agent to both sides of the paper at the size press. Inherent in this process are various mechanical problems which make it expensive to apply and maintain a uniform layer of the size on the surface of the paper. This mechanical equipment is costly, and there is the added expense of evaporating the water added to the paper with a dilute suspension of the size. Commonly the size is a starch or a starch derivative such as an oxidized or enzyme converted starch.

Starch has long been used as an additive to strengthen the paper sheet in the manufacture of paper. See for example Whistler and Paschall, *Starch: Chemistry and Technology*, Academic Press Inc., New York, N.Y. Vol. 2, 1967, Chapter VI. For this purpose, starch is added to the stock. This procedure produces much soluble material which is not effectively retained in the paper sheet. An improvement in starch cooking was disclosed in U.S. Pat. No. 2,805,966, issued Sep. 10, 1957, wherein the starch slurry was heated in a steam injection cooker. This was said to permit control of the heating so that the majority of the starch granules were swollen but not ruptured. However, the temperature range over which granules of starch swell and gelatinize is large. Even in this process only a portion of the granules could be obtained in the desired swollen state. Some starch granules were still unswollen and hence useless as an adhesive while others might have been solubilized and not retained in the paper.

One method to obtain a starch whose swollen granules do not disintegrate during agitation was disclosed in U.S. Pat. No. 2,113,034, issued Apr. 5, 1938. This was accomplished by reaction of starch with formaldehyde. The product is resistant to dispersion in hot water, and requires treatment with alkali and vigorous agitation to render the starch suitable as a paper stock additive. As a result of these treatment requirements and because the starch is only partially retained in the paper sheet, the product has never found acceptance in the paper manufacturing industry.

A second method to obtain a starch whose swollen granules would not disintegrate during agitation was disclosed in U.S. Pat. No. 2,328,537, issued Sep. 7, 1943. This was accomplished by reacting the starch with certain antimony or phosphorous chlorides or oxychlorides. The patent suggested that the products might be useful in the manufacture of paper. Again, these products have never found acceptance in the paper manufacturing industry, because the products described show limited swelling in hot water and are only partially retained in the paper sheet.

It would therefore be an advance in the art if an additive were discovered which could be incorporated into the paper stock prior to and/or during the sheet formation that would impart improved internal properties to the paper. If such properties could be imparted without causing detrimental side effects, the additive in question would find ready acceptance in the art. Moreover, if the properties of the finally formed paper article, such as burst strength and tensile strength were improved by means of the additive, this would be an added economic benefit to be gained through use of an additive of this type.

It is therefore an object of the invention to provide a new and improved method for imparting such characteristics to manufactured paper by the addition of a specific additive to the stock during the papermaking process.

A further object is to provide an agent of this type to improve properties without interfering with the other additives and substances used in the makeup and manufacture of paper and without showing adverse effects on the chemical and physical characteristics of the finished sheet.

Another object of the invention is to provide an additive for improving internal properties which is retained in the paper during the sheet forming process.

An important object of the invention is to provide an additive for improving properties of manufactured paper which will operate on a wide variety of paper stocks, is safe to handle and will impart to the finished sheet desirable characteristics.

Another object of this invention is to provide a method of improving surface properties of manufactured paper by employing a new additive at the wet end which imparts improved dry strength to the finished paper article.

A still further object of this invention is to provide a starch additive for paper that is readily prepared and whose swollen granules do not disintegrate when subjected to vigorous agitation.

The term "wet end" as it is used herein refers to that part of the papermaking process including the stock preparation, the approach flow system and that part of the paper machine prior to the dryer section.

All percentages set forth herein are by weight unless otherwise specified.

SUMMARY OF THE INVENTION

Starches from various plant sources can be employed according to the invention provided that they have predictable swelling properties. The starches can be modified or unmodified, mixtures of modified and unmodified starches and mixtures of starches from different sources which are modified or unmodified or mixtures thereof, provided they are granular and the components have the same swelling properties.

The wet end additive composition of the invention is prepared by controlled swelling of the granules of a starch slurry having a low dry substance concentration to obtain a two phase solution wherein swollen non-broken starch granules are maintained in suspension as a colloidal dispersion of starch. More specifically, the composition of the invention is a two phase, swollen starch suspension having a dry substance from about 0.5% to about 30%, a cooked swollen volume from about 1.6 ml/gram to about 100 ml./gram and cooked solubles from about 0.5 to about 50%.

The composition of the invention is obtained by employing as a starting material a starch suspension (also referred to herein as a "slurry") having a dry substance concentration of about 30% or less and by carefully controlling the swelling temperature and/or pH conditions to avoid or minimize the disruption (breakage) of the swollen granules. When these conditions are not properly controlled, the granules become disrupted and a one phase solution is made which is not as effective as the two phase solution of the invention when used as a wet end additive. On the other hand, the granules must be sufficiently swollen according to the invention so that they will be retained as granules on the web in the papermaking machine. It is an objective of the invention to swell the granules in a controlled way so as to achieve maximum volume for the particular starch involved without breakage. Of course, when the material enters the drying section of the papermaking machine it is desirable that the swollen granules complete their gelatinization.

The maximum dry substance of the starch suspensions which can be used as starting materials of the invention will vary with the type of apparatus employed to cause swelling. A relatively higher concentration can be used in a heated continuous system than in a batch system because the granules are heated more quickly in a continuous system and are less likely to overheat and break because they are only briefly exposed to the heat. The slurry in a continuous system (such as in a jet cooker) can have a dry substance concentration up to about 30%, preferably up to about 20%, more preferably from about 3% to about 10%, and most preferably from about 3% to about 8%. In a batch system, the slurry can have a dry substance concentration up to about 30%, preferably up to about 20%, more preferably from about 3% to about 10% and most preferably from about 3% to about 8%.

The optimum temperature and pH conditions will vary depending upon the type of starch employed and whether or not the starch is modified. Generally for heated systems the temperature can range from about 55° C. to about 95° C. and the pH can range from about 4.0 to about 13.0. Generally, higher temperatures are employed with lower pH and lower temperatures are employed with higher pH.

After the two phase swollen starch suspension of the invention is prepared, it can be diluted to a concentration as low as about 0.5%, preferably as low as about 1%, before it is employed as a wet end additive in the manufacture of paper. According to the invention, the two phase swollen starch suspension is added to the stock after any refining step in a papermaking process.

DETAILED DESCRIPTION OF THE INVENTION

The starch granules in a starch slurry may be swollen either with heating in a continuous batch system, or through a low temperature (ambient) batch system with an alkaline solution. When a continuous system is employed, the starch slurry starting materials can have a dry substance concentration up to about 30%, preferably up to about 20%, more preferably from about 3% to about 10% and most preferably from about 3% to about 8%. When a batch system is employed, the starch slurry starting materials should have a dry substance concentration up to about 30%, preferably up to about 20%, more preferably from about 3% to about 10% and most preferably from about 3% to about 8%.

Starches which can be used include any starches having predictable swelling properties and these include unmodified and modified starches derived from any farinaceous material, such as corn, waxy maize, potato, rice, wheat, sago and manioc. Modified starches can include physically and chemically modified starches and combinations thereof, provided they are granular and the components have the same swelling properties.

The starches are conventionally slurried with water. The pH of the starch slurry can vary from about 4 to about 13. The preferred pH for continuous systems and for heated batch systems is from about 5 to about 8 and the most preferred pH is from about 5.5 to about 7. In low temperature (ambient) batch systems the pH is first adjusted to from about 9 to about 13 and maintained at that level for a sufficient time to cause the desired amount of swelling to occur, generally from about 5 minutes to more than one hour, preferably for about 10 to 30 minutes. (The desired amount of swelling is the maximum that can be obtained without disrupting the starch granules during the papermaking process before the drying section.) Then the pH is adjusted to from about 5 to about 9. Suitable alkalies for adjusting the pH are mainly selected from the group consisting of alkali metals and alkaline earth metal bases such as sodium hydroxide and calcium hydroxide. Typically, sodium hydroxide is used. Suitable acidic reagents for adjusting the pH are selected from the group consisting of hydrochloric acid, sulfuric acid, boric acid or salts such as aluminum sulfate. Typically, sulfuric acid and aluminum sulfate are used.

The temperature and time of the swelling process will vary with the type of starch and the type of equipment used. In a continuous system, a starch slurry is pumped to a jet cooker and steam is injected into the jet cooker in order to obtain, and maintain within a controlled range, a preselected, steady state swelling temperature of from about 55° C. to about 95° C. The preferred swelling temperatures will vary depending upon the starch which is used as summarized in Table I.

TABLE I

Preferred Swelling Temperatures for Continuous System

| Starch | Temperature (°C.) | Kofler[1] Gelatinization Temperature Range (°C.) |
|---|---|---|
| Corn | 70–75 | 62–72 |
| Waxy Maize | 70–75 | 63–72 |
| Potato | 62–69 | 58–68 |
| Wheat | 75–85 | 58–64 |
| Rice | 75–95 | 68–78 |
| Sago | 70–75 | 60–72 |
| Manioc | 60–70 | 59–69 |

[1]Van Beynum, G. M. A. & Roels, J. A., Starch Conversion Technology, pages 31–38, Marcel Dekker Inc., N.Y. 1985.

In a heated batch system, a tank is employed and the contents are heated using direct injection of steam or a steam jacket. The tank is provided with an agitator to maintain the starch in suspension and cause more uniform heating.

A slurry having a dry substance concentration up to about 30%, preferably up to about 20%, more preferably from about 3% to about 10% and most preferably from about 3% to about 8%, is swollen by heating the slurry up to a swelling temperature from about 55° C. to about 95° C. for from about 5 minutes to more than one hour, preferably from about 10 to about 30 minutes. Steam supply is adjusted in order to maintain the slurry within the preferred swelling temperature range. The preferred swelling temperatures will vary depending upon the starch which is used as summarized in Table II.

TABLE II

Preferred Swelling Temperatures for Heated Batch System

| Starch | Temperature (°C.) | Kofler Gelatinization Temperature Range (°C.) |
|---|---|---|
| Corn | 70–80 | 62–72 |
| Waxy Maize | 70–80 | 63–72 |
| Potato | 62–74 | 58–68 |
| Wheat | 75–90 | 58–64 |
| Rice | 75–95 | 68–78 |
| Sago | 70–80 | 60–72 |
| Manioc | 60–75 | 59–69 |

In a low temperature batch system, a slurry having a dry substance concentration up to about 30%, preferably up to about 20%, more preferably from about 3% to about 10% and most preferably from about 3% to about 8%, is swollen by increasing the pH of the slurry to a swelling pH from about 9 to about 13 for from about 10 to about 30 minutes until swollen to the maximum. Then the swelling is stopped by adjusting the pH to from about 5 to about 9 using an acidic reagent. The swelling reaction in this system is carried out at ambient temperature, generally from about 10° C. to about 35° C.

In a preferred embodiment of the low temperature system, the pH is increased to from about 12 to 13 with a sodium hydroxide solution having a concentration from about 2% to about 10%, dry substance. The solution is held at that pH for from about 10 to about 15 minutes until swollen to the maximum and then adjusted to a pH from about 6 to 7 using hydrochloric acid having a concentration from about 5% to about 20%.

Following swelling by any of the means discussed above, the swollen starch suspension can be diluted to a concentration as low as about 0.5% before it is used as a wet end additive in the manufacture of paper.

The wet end additive product prepared according to the method of the present invention has swollen but unruptured starch granules having a cooked swollen volume (C.S.V.) from about 1.6 ml/g to about 100 ml/g, preferably from about 4 to about 65 ml/g, and cooked solubles (C.S.) from about 0.5% to about 50%, preferably from about 1% to about 35%. Optimal C.S.V. and C.S. values will vary depending upon the type of starch employed as summarized in Table III.

TABLE III

Optimal C.S.V. and C.S. Values

| Starch | C.S.V.(ml/g) | C.S.(%) |
|---|---|---|
| Corn | 4–6 | 2–4 |
| Waxy Maize | 5–20 | 1–7 |
| Potato | 30–60 | 30–40 |
| Wheat | 7–10 | 6–10 |
| Rice | 10–30 | 7–25 |
| Sago | 25–65 | 20–35 |
| Manioc | 15–40 | 6–15 |

The procedures and formulas for calculating C.S.V. and C.S. are as follows:

To 10.00 g dry basis of starch in a 600-ml stainless steel beaker is added 190.0 g of distilled water. Cover with a watch glass having a center hole for a stirring shaft. Stir at 500 rpm for 18 min. in a boiling water bath. Cool to 28° C. by stirring in a cold water bath. Add distilled water to replace exactly the water lost by evaporation, transfer to a 250-ml centrifuge bottle and centrifuge at 2000 rpm for 10 min. Mark the level of the paste in the bottle. To determine solubles, a weighed aliquot of the supernatant liquid is evaporated on a steam bath. Then the residue is dried for 4 hours at 120° C. in a vacuum oven and weighed. The percent solubles (C.S.) is calculated as follows:

$$C.S. = \frac{\text{Weight of Residue} \times 1900}{\text{Weight of Aliquot}}$$

The volume the paste occupied in the centrifuge bottle is measured in milliliters (ml). The C.S.V. is calculated as follows:

$$C.S.V. = \frac{\text{Paste Volume (ml)}}{\text{Insoluble Weight (g)}}$$

-continued $$\text{Where Insoluble Weight} = 10.00 \left(1 - \frac{\% \text{ Insolubles}}{100}\right)$$

Depending on the starch evaluated, the weight of the sample to be tested may vary from two (2) grams to ten (10) grams with corresponding adjustment in the calculation formulas.

When starch granules begin swelling, they start to lose their polarization crosses (loss of birefringence), increase in optical transmittancy and rise in viscosity. Measurement of the size of the swollen granules can be done microscopically at a magnification of no less than 100 times using a micrometer lens. Samples are taken and measured at different temperatures until the maximum size without disruption is reached. At this point, the C.S.V. is measured at from about 1.6 ml/g to about 100 ml/g and C.S. is measured at from about 0.5% to about 50%.

The wet end additive composition of the invention may be added to a paper stock having a pH from about 4 to about 9. The stock may include hard wood, soft wood or non wood fibers (i.e., Bagasse) or a blend of the same, and fibers may be bleached or unbleached, virgin or recycled. The stock also may include fillers, dyes, sizing agents and any other additives.

The wet end additive composition of the invention may be added at any point after the refining step in the paper making process. The additive composition can be employed in an amount up to about 25%, preferably from about 0.5% to about 7% and more preferably from about 0.5% to about 4% by weight of starch (dry substance) based on total paper weight in the stock. The wet end additive composition can be added to any grade of paper, of any grammage.

The most important benefits of the use of the swollen starches of the invention as compared with cooked starches are:

A higher total starch retention due to the higher starch granule volume;

A lower biological oxygen demand (B.O.D.) in the white water sent to sewage;

A higher paper strength with the same amount of starch added to the paper (due to higher starch retention);

A lower amount of steam required to have the starch ready to be added to the paper machine.

EXAMPLES

Example 1

An aqueous slurry of unmodified potato starch at a concentration of 6.0% by weight dry substance was swollen in a conventional batch system for about 12 minutes. Steam was injected into the slurry and the rate of injection was adjusted in order to maintain the slurry temperature between 62° and 69° C.

At the end of the swelling process, cold water having a temperature of about 22° C. was added to the tank to dilute the concentration to about 3% dry substance. The C.S.V. was from 32 ml/gram to 58 ml/gram and the C.S. was from 34% to 41%.

A furnish was prepared with a 50:50 blend of Bleached Softwood Kraft("BSWK") and Bleached Hardwood Kraft ("BHWK") fibers resuspended in water at 1% by weight dry substance of fiber using a pilot plant hydrapulper for 15 minutes at 3000 RPM. 1% of rosin size and 2% of alum also were added at the hydrapulper.

The pH of the furnish was adjusted to 4.8 with sulfuric acid.

Different amounts of the swollen starch suspension were added to the furnish and it was subjected to a shear rate of about 200 RPM when the swollen starch suspension was added to the furnish. Paper handsheets were formed in a Laboratory Williams Handsheets Former, and grammage varied from 60 to 80 g/m$^2$.

A 30 second dynamic drainage evaluation was performed with a Dynamic Paper Chemistry Jar™ Mark III, as it is described in the Operating Manual supplied by the Paper Chemistry Laboratory, Inc., Stoneleigh Avenue, Carmel, N.Y. 10512, U.S.A.

Total retention of each furnish was measured with the sample of white water obtained from the 30 second dynamic drainage test. (Total retention is defined as the amount of filler and fibers retained in the paper handsheet divided by the total amount of filler and fiber in the furnish.)

The amount of solids in the filtrate collected during the drainage evaluation was obtained by filtering it through a standard filter (589$^2$ White Ribbon ashless paper manufactured by Schleicher & Schuell P.O. Box 4, D-3354 Dasel, Germany) and drying them in an oven to dryness.

The amount of filler and fibers retained in the paper sheet can be determined by subtracting the amount of solids in the filtrate from the amount of solids in the furnish.

Starch retention was evaluated measuring starch content with the Phenol/Sulfuric Acid Method. This method involves extracting the starch from the paper (2 g.) by boiling for 30 minutes the ground paper sample in a solution of 33° Baumé (Bé) calcium chloride adjusted with glacial acetic acid to pH 1.8. The slurry is then filtered and the pulp washed with water. 40 ml. of the filtrate are diluted to 100 ml. with water. One ml. of this dilution is spectrophotometrically quantitated for starch by staining with 1 ml. of 0.5% phenol and 5 ml. concentrated sulfuric acid. Optical Density of the sample is read at 490 mµ and the amount of starch is obtained from a standard curve. The following formula is used:

$$\% \text{ Starch} = \frac{g. \text{ starch} \times 1000 \times 100}{\text{sample weight } g. \times 0.4}$$

The results of the tests showed that the starch retention improvements of the swollen potato starch compared with cooked potato starch were in the range of 30 to 50%, while no differences were observed in total retention and dynamic drainage. (The cooked potato starch was prepared using the same 6% by weight aqueous slurry by cooking with steam in a batch system at a temperature from 93° to 95° C. for 20 minutes. Following cooking, water was added to dilute the concentration to about 3% dry substance. The starch granules were completely disrupted.)

Example 2

An aqueous slurry of unmodified manioc starch at a concentration of 6.0% by weight (dry substance) was pumped to a jet cooker. Steam injection was adjusted in order to maintain a temperature between 60° and 70° C. Cold water was added to dilute the swollen starch concentration to 2% dry substance. The C.S.V. was between 15 ml/gram and 40 ml/gram and the C.S. was between 6% and 14%.

A furnish was prepared with 100% of recycled fibers from old corrugating containers ("OCC"), resuspended in water at a pilot plant hydrapulper for 30 minutes at 3000 RPM. Fiber dry substance was 1% (no resin or filler was added).

The pH of the furnish was adjusted to about 4.8 with sulfuric acid.

Different amounts of the swollen starch suspension were added to the furnish and were subjected to a shear rate of about 200 RPM when the swollen starch suspension was added to the furnish. Paper handsheets were formed in a Laboratory Williams Handsheets Former, having a grammage that varied from 60 to 80 g/m$^2$.

Total retention, starch retention and 30 second dynamic drainage were evaluated as in Example 1.

The results of the tests showed that the starch retention improvements of the swollen manioc starch compared with cooked manioc starch were in the range of 40 to 90%, while no difference was observed in total retention and dynamic drainage. (The cooked manioc starch was prepared using the same 6% by weight aqueous slurry by pumping to a jet cooker and adjusting steam injection to maintain the temperature at about 100° C. Cold water then was added to dilute the swollen starch concentration to 2% dry substance. The starch granules were completely disrupted.)

Example 3

An aqueous slurry of unmodified corn starch at a concentration of 6% by weight (dry substance) and at about 25° C. was swollen in a batch system for 10 to 15 minutes by increasing the pH of the slurry up to between 12.0 to 13.0 by adding a 5% by weight (dry solids) solution of sodium hydroxide. Then the pH was adjusted to 7.0 with a 10% solution of hydrochloric acid.

At the end of the swelling process cold water (having a temperature of about 24° C.) was added to the swollen starch suspension to dilute the concentration to about 3% dry basis. The C.S.V. was between 4 ml/gram and 7 ml/gram and the C.S. was between 0.7% and 3%.

A stock was prepared with a 30:70 blend of semichemical pulp and recycled fibers (OCC) resuspended in water in a pilot plant hydrapulper for 30 minutes at 3000 RPM, at 1% by weight (dry substance) of fiber. No resin or filler were added.

The pH of the furnish was adjusted to 4.8 with sulfuric acid.

Different amounts of the swollen starch suspension were added to the furnish and were subjected to a shear rate of about 200 RPM when the swollen starch suspension was added to the furnish. Paper handsheets were formed in a Laboratory Williams Handsheets Former, having a grammage which varied from 60 to 80 g/m$^2$.

Total retention, starch retention and 30 second dynamic drainage were evaluated as in Example 1.

The results of the tests showed that the starch retention improvements of the swollen corn starch compared with cooked corn starch were in the range of 20 to 50%, while no difference was observed in total retention and dynamic drainage. (The cooked corn starch was prepared using the same 6% by weight aqueous slurry by swelling with steam in a batch system at a temperature from 93° to 95° C. for 20 minutes. Following cooking water was added to dilute the concentration to about 3% dry substance. The starch granules were completely disrupted.)

Example 4

This example illustrates the properties of regular unmodified corn starch and waxy unmodified corn starch as wet end additives.

The following properties were evaluated:

Cooked Swollen Volume ("C.S.V.") at different temperatures, increments of five degrees Celsius from 60° to 85° C.

Cooked Solubles (C.S.) at different temperatures (the same as for C.S.V.)

Granule volume at different temperatures (from 50° to 95° C.)

To see the starch granule volume at different temperatures, both starches were cooked in a Brabender Viscograph (See J. A. Radley, *Examination and Analysis of Starch and Starch Products*, pp. 107–110, Applied Science Publishers Ltd. (London 1976), raising the temperature at a rate of 1.5° C./min. At different temperatures, some drops of product were collected, without interrupting the cooking process. The drops of product were mixed with a few milliliters of cold water to stop the swelling of the starch granules and the sizes of the swollen granules were measured microscopically using a micrometer lens.

Each starch was swollen at various temperatures in a batch system in increments of five degrees Celsius from 70° to 85° C. and paper handsheets were prepared with different amounts of starch added (1% and 3%) working with 100% of virgin fibers (50% BSWK and 50% BHWK), no filler, 1% rosin and 2% alum were added to the stock. The pH was adjusted to 4.8 with sulfuric acid. The following properties were evaluated:

First pass starch retention

Paper Strength:
  Burst Index
  Tensile Strength

Cooked Swollen Volume (C.S.V.) and Cooked Solubles (C.S.) also were evaluated.

The paper handsheets were conditioned at TAPPI[2] Room according to TAPPI No. 402 - om - 88 and for purposes of evaluating the process conditions and paper handsheets, the following test procedures were employed:

1. One pass starch retention-Phenol/Sulfuric Acid Method
2. Paper Properties:

| | | |
|---|---|---|
| ■ Bursting Strength (Burst Index) | | TAPPI No. 403 om - 91 |
| ■ Tensile Strength (Breaking Length) | | TAPPI No. 404 om - 87 |
| ■ Grammage | | TAPPI No. 410 om - 88 |

[2]TAPPI test methods are published and they are available from Technical Association of the Pulp and Paper Industry, One Dunwoody Park, Atlanta, Ga. 30341 U.S.A.

Cross sections of the paper handsheets were prepared and observed at the microscope stained with iodine and illuminated with no polarized transmitted light to see the starch distribution into the sheet.

The results of the analyses are shown in Table 1 for regular starch, Table 2 for waxy starch and Table 3 for reference. Starch analysis is summarized in Table 4.

The unmodified waxy maize corn starch, compared with unmodified regular corn starch, shows:

A higher cooked swollen volume and lower cooked solubles working at temperatures higher than 70° C. At temperatures lower than 70° C. there are no differences between both starches.

Higher improvement in one pass starch retention (probably due to its higher volume). The improvement obtained is from 57% to 85% for the waxy starch and from 28% to 53% for the regular starch.

Higher paper strength is obtained with the same amount of starch added to the paper (Burst Index is approximately 45% higher, and Breaking Length is approximately 20% higher) due to the higher starch retention. With the same content of starch in the paper (retention) Burst index is approximately 28% higher, and Breaking Length is approximately 18% higher due to the more homogeneous distribution of the starch into paper.

TABLE 1

| SAMPLE | REG/70/1 | REG/75/1 | REG/80/1 | REG/85/1 | REG/70/3 | REG/75/3 | REG/80/3 | REG/85/3 |
|---|---|---|---|---|---|---|---|---|
| Swelling Temperature (°C.) | 70 | 75 | 80 | 85 | 70 | 75 | 80 | 85 |
| Dosage (%) | 1 | 1 | 1 | 1 | 3 | 3 | 3 | 3 |
| Grammage (g/m$^2$) | 66.0 | 68.5 | 68.4 | 68.5 | 69.0 | 69.1 | 69.0 | 69.9 |
| Burst Index (kPa*m$^2$/g) | 0.94 | 1.03 | 1.04 | 0.96 | 1.15 | 1.12 | 1.28 | 1.08 |
| Breaking Length (m) | 1615 | 1524 | 1477 | 1578 | 1634 | 1628 | 1478 | 1941 |
| Starch Content (%) | 0.30 | 0.30 | 0.35 | 0.40 | 0.85 | 0.85 | 1.50 | 1.60 |
| Starch Retention* (%) | 30 | 30 | 35 | 40 | 28 | 28 | 50 | 53 |

*First Pass

TABLE 2

| SAMPLE | AMI/70/1 | AMI/75/1 | AMI/80/1 | AMI/85/1 | AMI/70/3 | AMI/75/3 | AMI/80/3 | AMI/85/3 |
|---|---|---|---|---|---|---|---|---|
| Swelling Temperature (°C.) | 70 | 75 | 80 | 85 | 70 | 75 | 80 | 85 |
| Dosage (%) | 1 | 1 | 1 | 1 | 3 | 3 | 3 | 3 |
| Grammage (g/m$^2$) | 69.0 | 38.8 | 68.2 | 70.1 | 69.0 | 68.6 | 68.4 | 69.3 |
| Burst Index (kPa*m$^2$/g) | 1.28 | 1.35 | 1.42 | 1.47 | 1.47 | 1.66 | 1.95 | 1.89 |
| Breaking Length (m) | 1677 | 1736 | 2007 | 1827 | 1814 | 2013 | 2123 | 2197 |
| Starch Content (%) | 0.75 | 0.75 | 0.80 | 0.85 | 1.70 | 2.05 | 2.45 | 2.25 |
| Starch Retention* (%) | 75 | 75 | 80 | 85 | 57 | 68 | 82 | 75 |

*First Pass

TABLE 3

| Sample | BLANK |
|---|---|
| Swelling Temperature (°C.) | — |
| Dosage (%) | — |
| Grammage (g/m$^2$) | 68.3 |
| Burst Index (kPa*m$^2$/g) | 1.00 |
| Breaking Length (m) | 1551 |
| Starch Content (%) | — |
| Starch Retention* (%) | — |

*First Pass

TABLE 4

STARCH ANALYSIS

| | Starch: | | | |
|---|---|---|---|---|
| | Regular | | Waxy | |
| Temperature | C.S.V. | C.S. | C.S.V | C.S. |
| 60° C. | 1.71 | 0.96 | 1.91 | 1.17 |
| 65° C. | 2.40 | 1.22 | 2.41 | 1.32 |
| 70° C. | 4.43 | 2.51 | 5.26 | 1.47 |
| 75° C. | 6.12 | 3.95 | 8.20 | 6.87 |
| 80° C. | 7.33 | 6.40 | 26.50 | 10.00 |
| 85° C. | 8.32 | 5.30 | 39.00 | 11.60 |
| Moisture | | 12.5% | | 11.8% |
| Scott Viscosity[3] | | 12 g/83 seg | | 7 g/84 seg |
| Brabender Viscoamilograph: | | | | |
| Pasting Temperature: | | 86° C.* | | 72° C.* |
| | | 74° C.** | | |
| Peak Temperature: | | no peak* | | 85° C.* |
| Viscosity at the Peak in Brabender Units ("BU") | | no peak* | | 610 BU* |

*measured at 6% of concentration
**measured at 8% of concentration
[3]Scott Viscosity is a method to determine the hot paste viscosity of starch pastes. The method is published in Kerr, R. W. "Chemistry and Industry of Starch", pages 119–121, 2nd Edition, 1950. Academic Press Inc., New York.

Example 5

This example illustrates the properties of manioc, potato, wheat, sago and rice starch as wet end additives.

For purposes of evaluating the swollen starches, the following test procedures were employed:

1. Cooked Swollen Volume (C.S.V.) at different temperatures
   Manioc: 55/60/65/70/75/80° C.
   Potato: 55/62/69/76/83° C.
   Wheat: 55/65/75/85/95° C.
   Sago: 65/70/75/80/85° C.
   Rice: 65/75/85/95/95°* C.
(*) The starch was maintained at 95° C. for 20 min.
2. Cooked Solubles (C.S.) at the same temperatures as for C.S.V.

The starches also were swollen at different temperatures in a conventional batch system as follows:
   Manioc: 60/68/76/84° C.
   Potato: 60/66/72/78° C.
   Wheat: 59/71/83/95° C.
   Sago: 69/74/79/84° C.
   Rice: 70/82/95/95°* C.
(*) The starch was maintained at 95° C. for 20 min.

Paper handsheets were prepared with different amounts starch added (1% and 3%), working with 100% of virgin pulps (50% BSWK and BHWK), no filler, 1% rosin size and 2% alum in the stock. The pH was adjusted to 4.8 with sulfuric acid.

The paper handsheets were conditioned at TAPPI Room according to TAPPI No. 402 - om - 88 and for purposes of evaluating the process conditions and paper handsheets, the following test procedures were employed:

1. One pass starch retention-Phenol/Sulfuric Acid Method
2. Paper Properties:

| | | |
|---|---|---|
| ■ | Bursting Strength (Burst Index) | TAPPI No. 403 om - 91 |
| ■ | Tensile Strength (Breaking Length) | TAPPI No. 404 om - 87 |
| ■ | Grammage | TAPPI No. 410 om - 88 |

Cross sections of the paper handsheets were prepared and observed under the microscope stained with iodine and illuminated with unpolarized transmitted light to see the starch distribution into the sheet.

Table 5A gives the results of the analyses for manioc starch, Table 5B for potato starch, Table 5C for wheat starch, Table 5D for sago starch and Table 5E for rice starch.

TABLE 5A

| | Manioc Starch | | | | | | | |
|---|---|---|---|---|---|---|---|---|
| SAMPLE | Man/60/1 | Man/68/1 | Man/76/1 | Man/84/1 | Man/60/3 | Man/68/3 | Man/76/3 | Man/80/3 |
| Swelling Temperature (°C.) | 60 | 68 | 76 | 84 | 60 | 68 | 76 | 84 |
| Dosage (%) | 1 | 1 | 1 | 1 | 3 | 3 | 3 | 3 |
| Grammage (g/m²) | 68.9 | 71.0 | 72.1 | 70.0 | 71.9 | 66.9 | 71.0 | 69.6 |
| Burst Index (kPa*m²/g) | 1.18 | 1.23 | 1.45 | 1.74 | 1.69 | 1.72 | 1.85 | 2.05 |
| Breaking Length (m) | 2371 | 2480 | 2348 | 2487 | 2613 | 2716 | 2818 | 3013 |
| Starch Content (%) | 0.75 | 0.85 | 0.95 | 0.50 | 1.95 | 2.20 | 2.30 | 1 |
| Starch Retention* (%) | 75 | 85 | 95 | 50 | 65 | 73 | 77 | 57 |

*First Pass

TABLE 5B

| | Potato Starch | | | | | | | |
|---|---|---|---|---|---|---|---|---|
| SAMPLE | Pot/60/1 | Pot/66/1 | Pot/72/1 | Pot/78/1 | Pot/60/3 | Pot/66/3 | Pot/72/3 | Pot/78/3 |
| Swelling Temperature (°C.) | 60 | 66 | 72 | 78 | 60 | 66 | 72 | 78 |
| Dosage (%) | 1 | 1 | 1 | 1 | 3 | 3 | 3 | 3 |
| Grammage (g/m$^2$) | 71.4 | 70.9 | 74.4 | 72 | 71.3 | 72.4 | 72.7 | 72.1 |
| Burst Index (kPa*m$^2$/g) | 1.01 | 1.11 | 1.23 | 1.16 | 1.52 | 1.49 | 1.65 | 1.92 |
| Breaking Length (m) | 1987 | 2161 | 2284 | 2053 | 2141 | 2331 | 2077 | 2315 |
| Starch Content (%) | 0.60 | 0.70 | 0.60 | 0.60 | 1.90 | 1.70 | 1.75 | 1.60 |
| Starch Retention* (%) | 60 | 70 | 60 | 60 | 63 | 57 | 58 | 53 |

*First Pass

TABLE 5C

| | Wheat Starch | | | | | | | |
|---|---|---|---|---|---|---|---|---|
| SAMPLE | Wheat/59/1 | Wheat/71/1 | Wheat/83/1 | Wheat/95/1 | Wheat/59/3 | Wheat/71/3 | Wheat/83/3 | Wheat/95/3 |
| Swelling Temperature (°C.) | 59 | 71 | 83 | 95 | 59 | 71 | 83 | 95 |
| Dosage (%) | 1 | 1 | 1 | 1 | 3 | 3 | 3 | 3 |
| Grammage (g/m$^2$) | 68.8 | 70.5 | 70.5 | 70.5 | 69.1 | 70.5 | 70.7 | 70.6 |
| Burst Index (kPa*m$^2$/g) | 1.04 | 1.05 | 0.97 | 1.21 | 1.17 | 1.39 | 1.29 | 1.4 |
| Breaking Length (m) | 2000 | 2107 | 2295 | 2407 | 2098 | 2191 | 2358 | 2421 |
| Starch Content (%) | 0.7 | 0.9 | 0.85 | 0.7 | 1.35 | 1.4 | 1.7 | 1.6 |
| Starch Retention* (%) | 70 | 90 | 85 | 70 | 45 | 47 | 57 | 53 |

*First Pass

TABLE 5D

| | Sago Starch | | | | | | | |
|---|---|---|---|---|---|---|---|---|
| SAMPLE | Sago/69/1 | Sago/74/1 | Sago/79/1 | Sago/84/1 | Sago/69/3 | Sago/74/3 | Sago/79/3 | Sago/84/3 |
| Swelling Temperature (°C.) | 69 | 74 | 79 | 84 | 69 | 74 | 79 | 84 |
| Dosage (%) | 1 | 1 | 1 | 1 | 3 | 3 | 3 | 3 |
| Grammage (g/m$^2$) | 71.8 | 71.4 | 71.8 | 71.7 | 70.2 | 71.7 | 71.5 | 71.9 |
| Burst Index (kPa*m$^2$/g) | 1.04 | 1.22 | 1.11 | 1.37 | 1.41 | 1.62 | 1.69 | 1.72 |
| Breaking Length (m) | 1861 | 2051 | 2012 | 2097 | 2297 | 2689 | 2605 | 2819 |
| Starch Content (%) | 0.85 | 0.95 | 0.75 | 0.75 | 1.75 | 1.85 | 1.7 | 1.75 |
| Starch Retention* (%) | 85 | 95 | 75 | 75 | 58 | 62 | 57 | 58 |

*First Pass

TABLE 5E

| | Rice Starch | | | | | | | |
|---|---|---|---|---|---|---|---|---|
| SAMPLE | Rice/ 70/1 | Rice/ 82/1 | Rice/ 95/1 | Rice/ 95/1' | Rice/ 70/3 | Rice/ 82/3 | Rice/ 95/3 | Rice/ 95/3' |
| Swelling Temperature (°C) | 70 | 82 | 95 | 95' | 70 | 82 | 95 | 95' |
| Dosage (%) | 1 | 1 | 1 | 1 | 3 | 3 | 3 | 3 |
| Grammage (g/m$^2$) | 70.5 | 71.7 | 72.5 | 71.8 | 70.7 | 71.7 | 72.5 | 72.3 |
| Burst Index (kPa*m$^2$/g) | 1.05 | 1.06 | 1.12 | 1.21 | 1.33 | 1.41 | 1.4 | 1.65 |
| Breaking Length (m) | 1940 | 1986 | 2281 | 2027 | 2046 | 2204 | 2328 | 2220 |
| Starch Content (%) | 0.35 | 0.4 | 0.55 | 0.55 | 1.1 | 1.3 | 1.35 | 1.5 |
| Starch Retention* (%) | 35 | 40 | 55 | 55 | 37 | 43 | 45 | 50 |

'Held for 20 minutes
*First Pass

We were able to divide the starches evaluated into two groups:
a. Manioc, Potato and Sago.

They showed high Cooked Swollen Volume (C.S.V.), high Cooked Solubles (C.S.) and the highest first-pass starch retention, mainly working with high starch dosages.

b. Wheat and Rice.

They showed low C.S.V. and low C.S.

Sago starch swollen at 84° C. in a batch system also showed good results. (Similar behavior could be obtained by swelling the sago starch in a jet cooker at lower temperature.) It could be useful in countries where Sago starch is available and where starch modification channels do not exist.

What is claimed is:

1. A papermaking additive composition comprising a two phase suspension of swollen starch having a dry substance from about 0.5% to about 30% by weight, a cooked swollen volume from about 1.6 ml./gram to about 100 ml./gram and cooked solubles from about 0.5% to about 50% by weight.

2. The composition of claim 1 having a cooked swollen volume from about 4 ml./gram to about 65 ml./gram and cooked solubles from about 1% to about 35% by weight.

3. The composition of claim 1 wherein the starch is selected from the group consisting of corn, waxy maize, potato, wheat, rice, sago and manioc.

4. The composition of claim 1 wherein the starch is corn starch, the cooked swollen volume is from about 1.6 ml./gram to about 10 ml./gram and the cooked solubles are from about 0.5% to about 6%.

5. The composition of claim 1 wherein the starch is waxy maize corn starch, the cooked swollen volume is from about 1.9 ml/gram to about 40.0 ml/gram and the cooked solubles are from about 1.1% to about 12.0%.

6. The composition of claim 1 wherein the starch is potato starch and the cooked swollen volume is from about 32 ml/gram to about 58 ml/gram and the cooked solubles are from about 34% to about 41%.

7. The composition of claim 1 wherein the starch is manioc starch and the cooked swollen volume is from about 15 ml/gram to about 40 ml/gram and the cooked solubles are from about 6% to about 14%.

8. The composition of claim 1 wherein the dry substance is from about 0.5% to about 10% by weight.

9. The composition of claim 1 wherein the dry substance is from about 0.5% to about 8% by weight.

10. A method of making a papermaking additive composition comprising cooking a starch slurry having a dry substance from about 0.5% to about 30% by weight under controlled temperature conditions from about 55° C. to about 95° C. for a sufficient time to obtain a two phase suspension of swollen starch having a cooked swollen volume from about 1.6 ml./gram to about 100 ml./gram and cooked solubles from about 0.5% to about 50% by weight.

11. The method of claim 10 wherein the cooking is conducted in a continuous process at a pH from about 5 to about 8.

12. The method of claim 11 wherein the dry substance is from about 3% to about 10% by weight.

13. The method of claim 10 wherein the cooking is conducted in a batch process with continuous agitation, the dry substance is from about 3% to about 8% and the pH is from about 5 to about 8.

14. A method of making a papermaking additive composition comprising cooking a starch slurry, having a dry substance from about 3% to about 8% by weight, at ambient temperature, from about 10° C. to about 35° C., in a batch process with continuous agitation under controlled pH conditions wherein the pH is first adjusted with caustic to from about 9 to about 13 and maintained at that level for from about 5 to about 20 minutes followed by the addition of acid to reduce the pH to from about 5 to about 9 to obtain a two phase suspension of swollen starch having a cooked swollen volume from about 1.6 ml./gram to about 100 ml./gram and cooked solubles from about 0.5% to about 50% by weight.

15. A method of sizing paper comprising adding to the furnish in a papermaking process at a point after the refining step a papermaking additive composition comprising a two phase suspension of swollen starch having a dry substance from about 0.5% to about 30% by weight, a cooked swollen volume from about 1 ml./gram to about 100 ml./gram and cooked solubles from about 0.5% to about 50% by weight.

16. The method of claim 15 wherein the pH of the furnish is from about 4 to about 9.

17. The product of the process of claim 15.

* * * * *